United States Patent

[11] 3,586,357

| [72] | Inventor | Michel Orain<br>Courbevoie, France |
|---|---|---|
| [21] | Appl. No. | 833,291 |
| [22] | Filed | June 16, 1969 |
| [45] | Patented | June 22, 1971 |
| [73] | Assignee | Societe Anonyme: Glaenzer Spicer<br>Poissy, France |
| [32] | Priority | June 24, 1968 |
| [33] | | France |
| [31] | | 156,349 |

[54] COUPLING SYSTEM FOR ROTARY PARTS SUCH AS BALL RACES OR THE LIKE
6 Claims, 4 Drawing Figs.

| [52] | U.S. Cl. | 287/53 R |
|---|---|---|
| [51] | Int. Cl. | F16d 1/06 |
| [50] | Field of Search | 287/53 S,<br>53, 52.07, 52; 308/236; 64/9 |

[56] References Cited

UNITED STATES PATENTS

| 785,071 | 3/1905 | Pugh | 287/53 S |
|---|---|---|---|
| 1,326,892 | 12/1919 | Reynolds | 308/236 |
| 2,856,213 | 10/1958 | Hutchinson | 287/53 |
| 2,861,823 | 11/1958 | Perry | 287/52 |
| 2,906,558 | 9/1959 | Forbush | 287/53 X |

FOREIGN PATENTS

| 507,602 | 6/1920 | France | 287/53 |
|---|---|---|---|
| 694,986 | 8/1940 | Germany | 287/53 |
| 347,407 | 8/1960 | Switzerland | 287/53 |

Primary Examiner—Kenneth Downey
Assistant Examiner—Andrew V. Kundrat
Attorney—Baldwin, Wight & Brown ABSTRACT: The present invention relates to improvements relating to a coupling system for rotary part and consisting in providing radially disposed teeth, which do not require rigorous precision of manufacture on the side surfaces adapted to be engaged of the parts to be coupled, independently of the conventional assembling means of same, the teeth having identical characteristics to engage one another and provide angular wedging of the parts and relative centering with respect to the axis of rotation.

COUPLING SYSTEM FOR ROTARY PARTS SUCH AS BALL RACES OR THE LIKE

The present invention relates to a coupling system for rotary parts such as, for instance, ball bearings or roller bearings or the like.

Such rotary movement transmission parts are usually coupled by simply tightening the smooth portions of said parts by conventional screw means.

But this coupling system and the variants thereof have the great drawback that it is necessary to machine accurately centered members, such as circular shoulders, on the parts to be assembled to facilitate assembly of the parts or to obviate possible play and finally, to ensure that parts are interchangeable.

It is the aim of the invention to considerably simplify this mode of assembly and to make it more rapid both to manufacture and use while permitting centering and relative angular wedging of the rotating parts by means of a very simple improvement.

The improvement consists in providing radially disposed teeth, which do not require rigorous precision of manufacture, on the side surfaces adapted to be engaged of the parts to be coupled, independently of the conventional assembling means of same, the teeth having identical characteristics to engage one another and provide angular wedging of the parts and relative centering with respect to the axis of rotation.

Preferably, the teeth have straight sides and their contour only depends on the size of the parts and the extent of the torques to be transmitted from one part to the other.

The teeth can be formed about the entire circumference of the parts, or only on two or more arcs each of which only covers an annular sector of the latter.

The teeth can be positioned about one or more conventional assembling means parallel to the axis of the parts, or nearer the rotation axis of the said means, or between these last.

The teeth should preferably be short to ensure maximum efficacy of coupling.

Another aim of the invention is a method for forming the teeth on the parts to be assembled and which consists in impressing the teeth on the parts by cold stamping effected with a press by means of one or more tools with master teeth and a mounting tool comprising one bearing surface corresponding to the portion of the part to be stamped.

The invention is described in greater detail hereinafter, with reference to the appended drawings in which.

The invention can be used in many ways. As a simple example, without limitation, a coupling which can be taken apart into which axially stressed ball bearing, roller bearing or needle bearings are inserted may be mentioned.

Figure 1:
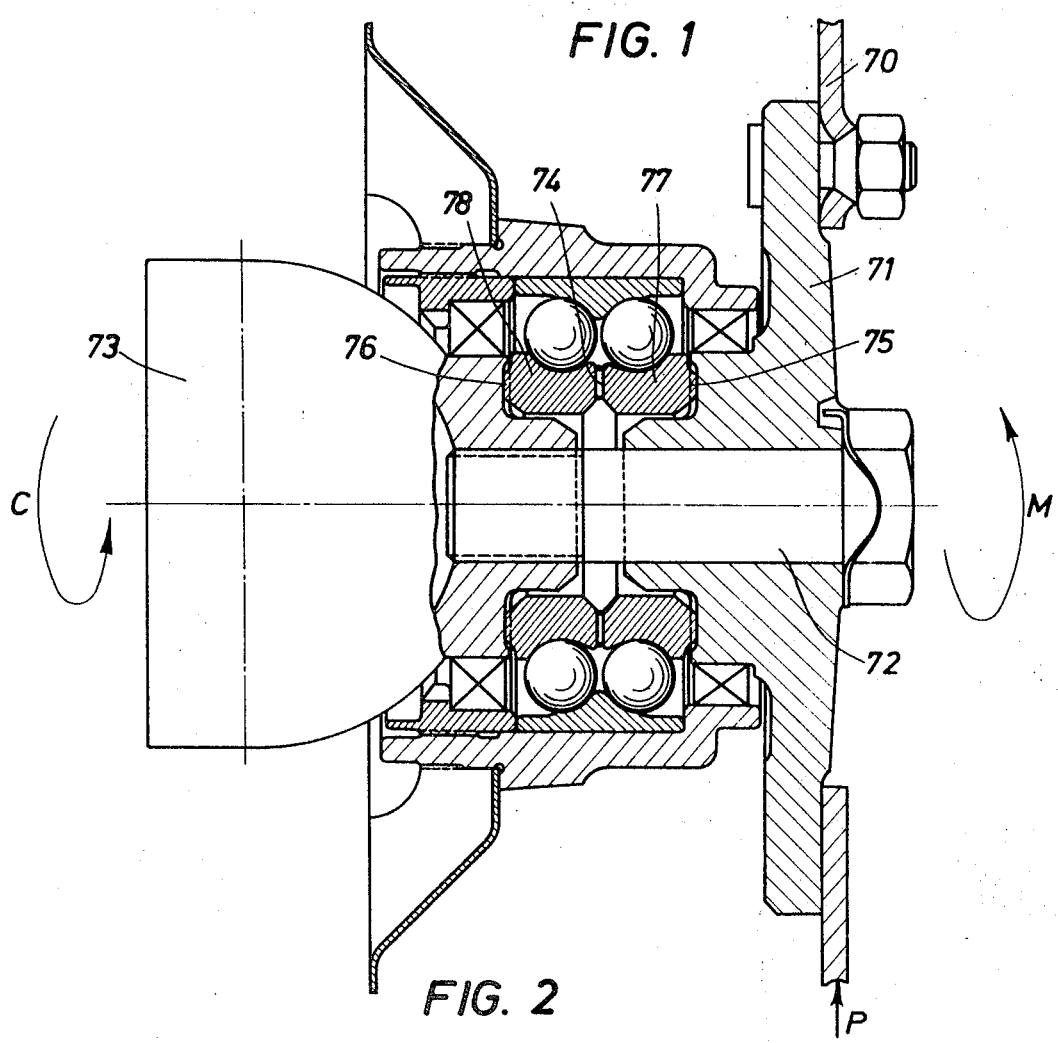
Fig. 1 shows a cross section of a bearing coupling which can be taken apart.

FIG. 1 shows one form of embodiment of this type of coupling applied, by way of example, to the hub of a front wheel drive vehicle. Wheel 70, shown partially, is bolted onto the sideplate 71 which is itself axially locked by the screw 72 engaged in socket 73 of the homokinetic transmission joint. There are inserted between socket 73 and sideplate 71 the two inner rings or races 77 and 78 of the ball bearing of this hub which are thus axially prestressed.

According to the invention, both of these inner bearing rings 77 and 78 have teeth on both end surfaces. Ring 77 has teeth 75 on the outer surface and teeth 74 on the inner surface thereof, which teeth engage with similar teeth formed on the inner surface of ring 78, and this ring has teeth 76 on the outer surface thereof.

Teeth 75 of ring 77 are interlocked by the axial pressure exerted by screw 72 with corresponding teeth of sideplate 71.

Teeth 74 of the two rings 77 and 78 are interlocked to couple together the two rings. Teeth 76 of ring 78 are interlocked with corresponding teeth formed in socket 73 of the transmission joint.

As the assembly is axially prestressed, and all the teeth are engaged only by their sides, the assembly composed of sideplate 71, bearing rings 77 and 78, socket 73 and screw 72 acts as if it were a single part when it undergoes exterior bias. These exterior biases are mainly:

torque C applied to socket 73 of the homokinetic joint and transferred to sideplate 71 by teeth 76, 74 and 75;

load P supported by the wheel is transferred to the inner rings of the bearing by facial teeth 75 and 74. The teeth positioned approximately at an angle of 90° with respect to the direction of the radial load P having their axes substantially perpendicular to this load, possess great resistance to radial biases such as load P;

the sloping moment M applied to the wheel reacts by variations of pressure applied to the teeth sides at moment M.

This wheel hub mounting has many advantages in as far as cost, technical qualities and reliability are concerned.

As regards price:

a. the frontal teeth are obtained quickly and with standard presses and are therefore cheap.

b. cold shaping is sufficiently precise for this purpose and no checking or matching is necessary to obtain easy mounting without play as well as total interchangeability.

c. it does away with the journal, which is indispensable in all conventional mountings, with the imperatives of rectifying the roller bearing aligning these bearings with grooves having narrow tolerances in spite of the distortions due to heat treatment.

d. it is easier to manufacture the inner bearing rings according to the invention than the same type of bearing applied to conventional hubs. In fact, only one rectifying operation is necessary, the one concerning the ball race. For this operation, the ring 77 is placed and maintained in position bearing on its facial teeth 74. The inner and facial rectifications which are compulsory on conventional bearings are abolished.

As far as quality is concerned, the assembly formed according to the invention behaves as if it were a single part and not the slightest slipping occurs between the various component members.

In conventional hubs, on the other hand, upon application of alternating torques, the journal is subjected to a resilient rotation of torsion, furthermore, the grooves always have a little play. Slipping thus occurs both between the bearing surfaces of the inner bearing rings and the homokinetic joint and between the journal screw and its bearing plane on the sideplate. As a result, grating contact corrosion, seizing and looseness of the journal nut may occur.

Moreover, in accordance with the embodiment conforming to the invention, no differential radial slipping occurs between the bearing surfaces of the bearings and the hub sideplate, as is the case with conventional hubs. Slipping of the same sort also, occurs between the two inner rings of conventional bearings. As a result, in the case of the mounting described in this application the conical rigidity of the wheel is increased.

Finally, with respect to reliability, in the mounting carried out according to the invention, the central screw 72 is subject solely to static tension under slight stress, thus permitting steel having high break elongation to be used.

The wheel-driving torque is transmitted solely by the inner rings of the bearing which have a superabundant capacity in torsion. Even in the impossible case of the driving teeth being destroyed, the wheel would remain securely fixed to the hub.

In conventional mountings, on the other hand, the alternating torques of the traction or braking of the motor are transmitted by the journal. If this journal is insufficiently resistant, as a result of incorrect heat treatment for instance, it will undergo alternating plastic torsions until it breaks and causes a serious accident owing to the vehicle loosing its wheel.

Figure 2:
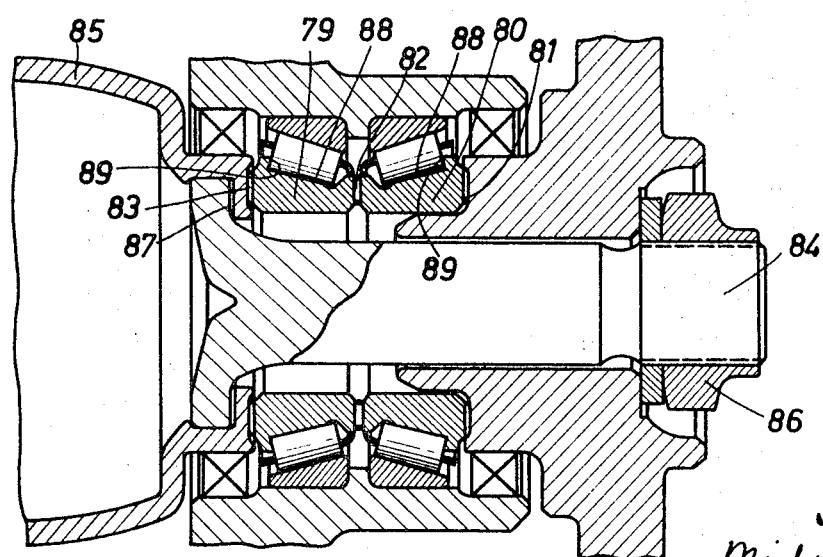
FIG. 2 shows a variant of the preceeding assembly.

FIG. 2 shows a variant of the preceeding mounting in which the inner rings 79 and 80 of a conical roller bearing are provided with facial teeth 81, 82, and 83.

The head of the central screw 84 is press-fitted into the bowl 85 of the transmission joint. Axial tightening is effected by a nut 86.

The facial teeth 87 formed in the bottom of the bowl 83 and on the inner annular surface of screw 84 prevent rotation thereof while nut 86 is being tightened.

Rectification of races 88 and bearings 89 of rings 78 and 80 is effected by positioning these rings and maintaining them by their teeth 82 on the grinding machine.

In the above description, all the advantages of coupling rotating parts by their side surfaces having radial grooves therein have been described, taking as an example the coupling of a vehicle wheel and the corresponding homokinetic transmission joint but, obviously, the same advantages can be obtained in all other applications of the said coupling system which may be put into effect.

Figure 3:
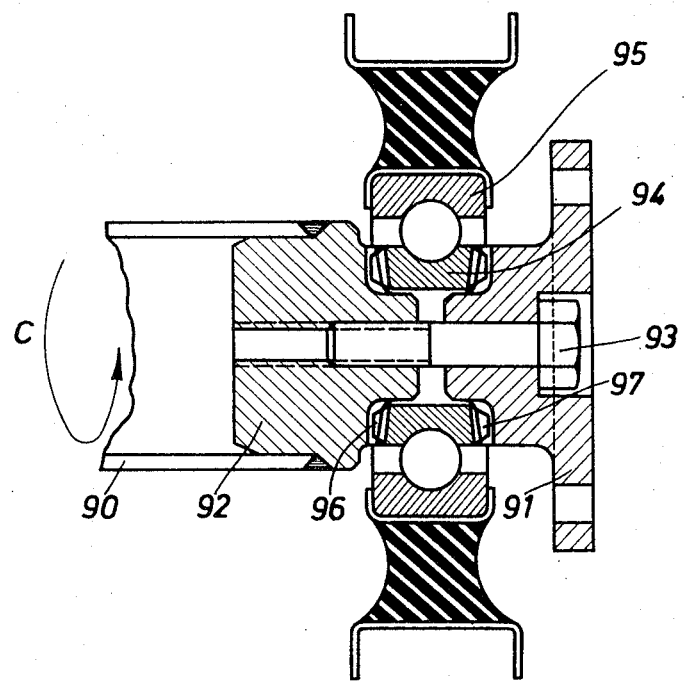
FIG. 3 shows a flexible intermediate bearing for a transmission shaft.

Among these applications may be mentioned, for instance, that shown in FIG. 3 which relates to a resilient intermediate bearing for a transmission shaft.

In this application, a transmission shaft 90 communicates a torque C to the flange 91 provided to receive a universal joint (not shown). Screw 93 exerts an axial force which bears strongly against the inner ring 94 of bearing 95, on the one hand, the end 92 welded to the pipe and, on the other hand, the flange 91.

The frontal teeth 96 ensure the coupling and radial centering of the end 92 and ring 94 and the frontal teeth 97 ensure the coupling and radial centering of this ring 94 and flange 91.

Simple and economical assembly of this intermediate bearing is thus achieved.

Figure 4:
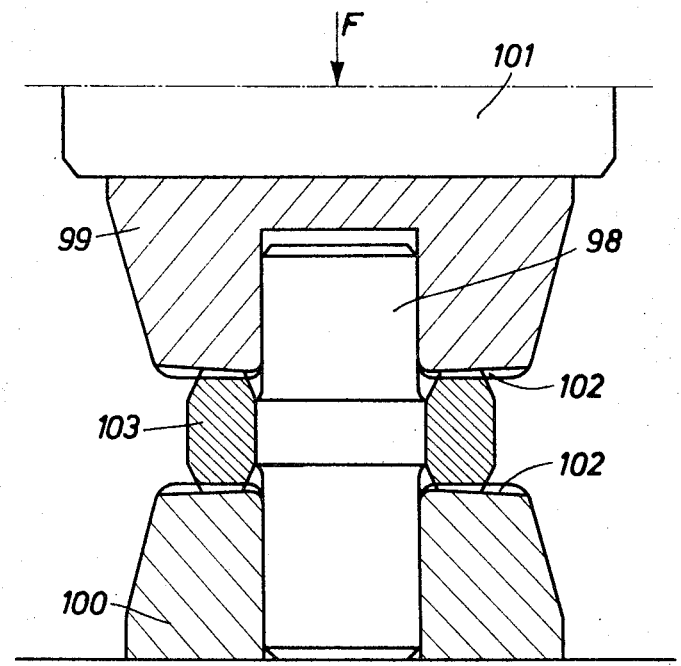
FIG. 4 shows a method of forming the facial teeth of ball races.

Facial teeth 96 and 97 of ring 94, as is the case of rings 77 and 78 of the couplings shown in the preceeding figures, are obtained as shown in FIG. 4, by cold pressing.

For this purpose, an efficient and accurate guide 98 ensures that the axes of tools 99 and 100 coincide during the action of the press push-rod 101. Tools 99 and 100, which are made of very strong steel are provided with master-teeth 102 which press simultaneously onto both surfaces of the inner bearing ring 103 which is treated after this pressing.

These means for forming frontal teeth on bearing rings are only cited as an example and said teeth of course can be formed by any other known process.

Although the invention relates more especially to ball bearings and the like by conferring upon them the possibility of use as driving and centering coupling members, it was be used in various applications whenever two or more parts which are adapted or engaged to each other have to be coupled, and this by applying the alterations in form and detail necessary in each specific case.

I claim:

A combined coupling and mounting system for rotary members, said system comprising a driving member and a driven member and a supporting bearing assembly, said bearing assembly including at least one inner bearing race capable of rotating with said driving and driven members, said bearing race having remote end surfaces provided with axially projecting teeth, said driving and driven members having surfaces opposing said bearing race end surfaces with said driving and driven member surfaces being provided with teeth, teeth of opposing surfaces of said bearing race and said driving and driven members being interlocked, and axial pressure applying means securing said driving member and said driven member against axial separation, said teeth of said bearing race and said driving and driven members having identical characteristics to gear together and ensure angular locking thereof and relative centering of said bearing race and said driving and driven members.

2. A coupling system according to claim 1, characterized in that, preferentially, the teeth have straight sides and their contour only depends on the sizes of the parts and the amount of the torque to be transmitted from one part to another.

3. A coupling system according to claim 1 characterized in that the teeth are formed about the entire circumference of the parts.

4. A coupling system according to claim 1 characterized in that the teeth are only formed on two or more arcs each of which cover one annular section of the parts.

5. A coupling system according to claim 1, characterized in that the teeth are preferably short in order to ensure the maximum efficacy of coupling of the parts.

6. A coupling system according to claim 1 characterized in that the parts having the teeth are inserted between the parts to be coupled, and the assembly so formed is placed under axial prestress.